United States Patent
Huang et al.

(10) Patent No.: US 10,980,272 B2
(45) Date of Patent: Apr. 20, 2021

(54) METHOD AND APPARATUS FOR RECYCLING CIGARETTE WASTE

(71) Applicant: MINIWIZ CO., LTD., Taipei (TW)

(72) Inventors: Chian-Chi Huang, Taipei (TW);
Tzu-Wei Liu, Taipei (TW);
Ling-Hsiang Weng, Taipei (TW);
Gerardo Miguel Rios Sánchez, Monterrey (MX)

(73) Assignee: MINIWIZ CO., LTD., Taipei (TW)

( * ) Notice: Subject to any disclaimer, the term of this patent is extended or adjusted under 35 U.S.C. 154(b) by 4 days.

(21) Appl. No.: 16/427,375

(22) Filed: May 31, 2019

(65) Prior Publication Data
US 2019/0364959 A1    Dec. 5, 2019

Related U.S. Application Data

(60) Provisional application No. 62/679,054, filed on Jun. 1, 2018.

(51) Int. Cl.
| | |
|---|---|
| *A24D 3/02* | (2006.01) |
| *A24D 3/10* | (2006.01) |
| *A24C 5/34* | (2006.01) |
| *B09B 3/00* | (2006.01) |
| *B26D 3/16* | (2006.01) |
| *B26D 7/01* | (2006.01) |
| *B26D 7/06* | (2006.01) |
| *B26D 7/18* | (2006.01) |
| *B26D 7/00* | (2006.01) |

(52) U.S. Cl.
CPC .............. *A24D 3/0295* (2013.01); *A24C 5/34* (2013.01); *A24D 3/10* (2013.01); *B09B 3/00* (2013.01); *B26D 3/16* (2013.01); *B26D 7/01* (2013.01); *B26D 7/0683* (2013.01); *B26D 7/1818* (2013.01); *B26D 2007/0018* (2013.01); *B26D 2007/013* (2013.01)

(58) Field of Classification Search
CPC .......... A24D 3/0295; A24D 3/10; A24C 5/34; A24C 5/36; B09B 3/00; B26D 3/16; B26D 7/01; B26D 7/0683; B26D 7/1818; B26D 2007/0018
See application file for complete search history.

(56) References Cited

FOREIGN PATENT DOCUMENTS

| EP | 2730183 A2 * | 5/2014 | ............... A24C 5/36 |
| WO | WO-2013030286 A1 * | 3/2013 | ............... A24C 5/36 |
| WO | WO-2013075791 A1 * | 5/2013 | ............... A24C 5/36 |
| WO | WO-2014135913 A1 * | 9/2014 | ............... A24C 5/36 |

* cited by examiner

*Primary Examiner* — Bayan Salone

(57) ABSTRACT

Disclosed herein are methods and apparatus for recycling cigarette waste, so that the reusable material (e.g., cellulose acetate, CA) in the cigarette waste may be isolated and reused. The cigarette waste is composed of a filter and a non-filter part. The apparatus includes at least, an adjusting unit and a treatment unit, respectively coupled to each other via a conveying member. The adjusting unit is configured to adjust the orientation of each cigarette so that each cigarette is aligned in sequence with the same orientation. The treatment unit is configured to cut out the non-filter part of each cigarette, and physically separating CA from the remaining part of the filter of each cigarette. Also disclosed herein is a method of recycling cigarette waste by use of the present apparatus.

9 Claims, 12 Drawing Sheets

METHOD AND APPARATUS FOR RECYCLING CIGARETTE WASTE

CROSS-REFERENCES TO RELATED APPLICATIONS

The present application claims priority under 35 USC section 119(e) to U.S. Provisional Application No. 62/679,054 filed Jun. 1, 2018, which is incorporated by reference herein as if fully set forth.

BACKGROUND

The present disclosure in general relates to the field of waste treatment and recycling, more particularly, to an apparatus for recycling cigarette waste.

DESCRIPTION OF RELATED ART

Cigarette is composed of tobacco and a filter. The filter, in general, is composed of cellulose acetate (CA) and at least one another functional material such as active carbon, charcoal, synthetic polymer (e.g., polypropylene (PP), polyactic acid (PLA) and the like), resin, absorbent, favoring agents and etc. The material in the filter, particularly cellulose acetate can be recycled and reused to minimize the consumption of raw material, while at the same time, addressing the potential pollution caused by toxic chemicals (e.g., nicotine and carcinogens (e.g., formalin) in the tobacco) leeching out of cigarette waste, particularly, from post-consumer cigarette waste, which is disposed wherever a smoker happens to be, thus often ends up in dumpsters and landfills, or get tossed as litter on shorelines, parks, and sidewalks.

In view of the foregoing, there exists in the art a need of methods and/or systems for recycling cigarette waste, which may address the potential environmental pollution issue by effectively recycling the cigarette waste.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

The present disclosure aims at providing methods and apparatus for recycling cigarette waste, including cigarette butts and industrial cigarette waste. As each cigarette waste has a filter and a non-filter part (i.e. the part that comprises tobacco), thus, the present methods and apparatus aims at removing tobacco from the cigarette waste, and recycling material(s) that are re-useable in the filter of the cigarette waste.

In one aspect, the present disclosure is directed to an apparatus for recycling cigarettes, particularly, cigarette waste. The apparatus comprises:
a conveying member for receiving cigarettes, in which each cigarette comprises a filter and a non-filter part;
an adjusting unit operably linked to the conveying member and configured to adjust the orientation of each cigarette so that each cigarette is aligned in sequence with the same orientation; and
a treatment unit operably linked to the adjusting unit comprising:
a holder for holding the aligned cigarettes in a manner that the non-filter part of each cigarette is exposed out of the holder;
a cutter configured to cut out the non-filter part of each cigarette held by the holder;
a pusher configured to go into the holder and push a part of the filter of each cigarette out of the holder after the non-filter part of each cigarette is removed by the cutter; and
a clamper disposed below the holder for clamping the pushed-out part of the filter of each cigarette so that it can be physically separated from the remaining part of the filter that remained in the holder, when the holder and the clamper respectively move in opposite direction.

According to preferred embodiments of the present disclosure, in the treatment unit, the pushed-out part of the filter is substantially made of cellulose acetate (CA).

According to optional embodiments, the apparatus further comprises a fluid supply module configured to supply a compressed fluid to the conveying member, the holder, and/or the cutter.

According to preferred embodiments of the present disclosure, the adjusting unit of the present apparatus comprises:
a first conduit for receiving the cigarettes in sequence;
a sensing unit comprising a first receiver coupling to the first conduit for capturing the cigarettes transferring out from the first conduit; and an orientation sensor for detecting the orientation of each cigarette captured in the first receiver; and
a rotatory member comprising a second receiver for accommodating the cigarettes transferred out from the sensing unit; and an actuator configure to rotate the second receiver, so that each cigarette transferred out of the adjusting unit are respectively in the same orientation.

According to optional embodiments of the present disclosure, the apparatus further comprises a feeding unit for transferring the cigarettes onto the conveying member.

According to optional embodiments of the present disclosure, the apparatus may further comprise a sorting unit coupling to the feeding unit for sorting the cigarettes based on pre-determined parameter(s). Examples of pre-determined parameter include, but are not limited to, size, length, conductivity, and the like.

According to some embodiments of the present disclosure, the sorting unit comprises a size sensor for identifying the size of each cigarette; and a remover configured to expel cigarettes respectively having sizes that do not meet with a pre-determined size out from the feeding unit.

According to preferred embodiments of the present disclosure, the remover is configured to expel cigarettes via a compressed fluid. In certain embodiments, the remover is configured to expel cigarettes via use of a rod member to push the cigarettes out of the conveying member.

Another aspect of the present disclosure aims at providing a method for recycling cigarettes by use of the present apparatus described above. The method comprises:
(a) adjusting the orientation of each cigarette so that each cigarette is aligned in sequence with the same orientation;
(b) holding each cigarette of the step (a) in the holder with the non-filter part of each cigarette being exposed out of the holder;

(c) separating the non-filter part from the filter of each cigarette in the step (b) by a force created by: (1) moving the cutter and the holder simultaneously in opposite directions, (2) moving the holder away from the cutter, while the cutter remains stationary, or (3) moving the cutter away from the holder, while the holder remains stationary;

(d) pushing a part of the filter of each cigarette out of the holder by the extruder;

(e) clamping the push-out part of the filter by the clamper; and (f) separating the push-out part of the filter part, which is clamped by the clamper, from the remaining part of the filter part, which is held in the holder, by (i) moving the holder away from the clamper while the clamper remains stationary, or (ii) moving the clamper away from the holder while the holder remains stationary;

wherein, the step (a) is performed in the adjusting unit of the present apparatus, while the steps (b) to (f) are performed in the treatment unit of the present apparatus.

According to optional embodiments, the present method may further comprises the step of, eliminating cigarettes that do not comply with a pre-determined parameter before the step (a). The pre-determined parameter may be any of a size, a length, a conductivity or a combination thereof, of the cigarette.

According to embodiments of the present disclosure, in the step (a), the orientation of each cigarette is adjusted by steps of:

(1) detecting the orientation of each cigarette by use of an orientation sensor; and (2) rotating each cigarette until the orientation as detected in the step (1) is consistent with a pre-determined orientation.

According to embodiments of the present disclosure, in the present method, the push-out part of the filter is substantially made of cellulose acetate (CA).

According to embodiments of the present disclosure, in the step (2), each cigarette is rotated 180 degrees.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1:
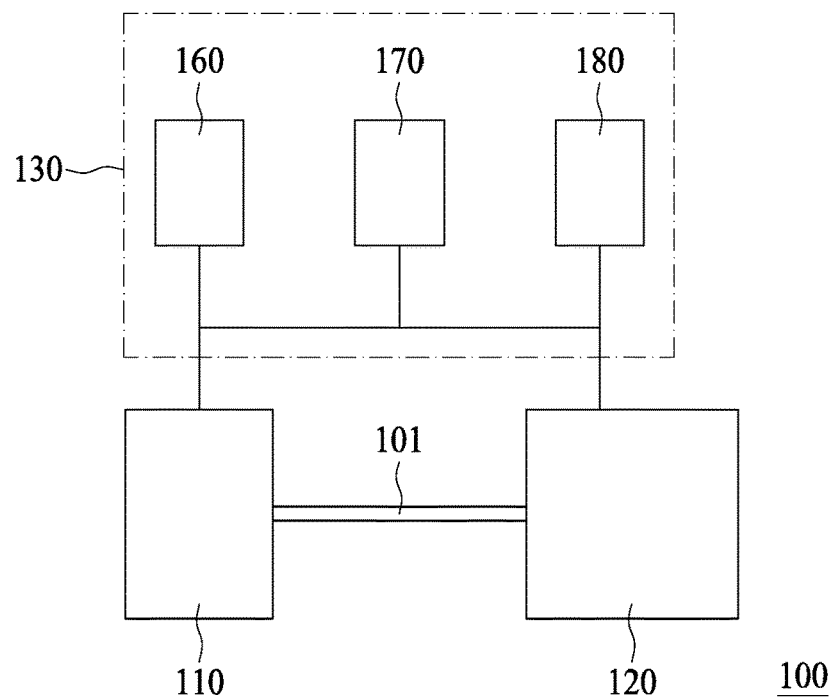
FIG. 1 is a schematic diagram illustrating the floor plane of an apparatus 100 for recycling cigarette waste according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION OF INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

1. Definition

For convenience, certain terms employed in the specification, examples and appended claims are collected here. Unless defined otherwise, all technical and scientific terms used herein have the same meaning as commonly understood by one of the ordinary skill in the art to which this invention belongs.

As used herein, the terms "cigarette" and "cigarette waste" are used interchangeably in the present disclosure, and refers to an industrial cigarette waste, tobacco waste, or a cigarette butt. The industrial cigarette waste may be cigarettes that do not meet the required specification and are thus discarded, such as cigarettes that are damaged during production, transportation, and/or storage. The cigarette butt, on the other hand, refers to the part of cigarette tosses away by a user after most of the tobacco inside the cigarette has been consumed, thus, the cigarette butt in general is composed of a complete filter, and a small portion of tobacco wrapped in the cigarette paper (i.e., non-filter part).

The "filter" refers to a cigarette filter made of cellulose acetate (CA) and at least one material that is any of active carbon, charcoal, synthetic polymer (e.g., polypropylene (PP), polyactic acid (PLA) and the like), resin, absorbent, functional agent (e.g., a favoring agent), and etc. In one embodiment, the filter is composed of two blocks of material, a block of CA, and a block of non-CA material (e.g., active carbon, PP, PLA, resin, absorbent, and etc) adjacent to the CA block. In another embodiment, the filter may be composed of three blocks of material, with one block of non-CA material being disposed between two blocks of CA.

The singular forms "a", "and", and "the" are used herein to include plural referents unless the context clearly dictates otherwise.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

2. Methods and Apparatus for Recycling Cigarette Waste

The present disclosure aims at providing a novel method and apparatus for recycling reusable material in cigarette waste, particularly reusable material in the cigarette filter (e.g., CA).

Reference is made to FIG. 1, which is a schematic diagram illustrating the floor plane of an apparatus 100 for recycling cigarette waste according to one embodiment of the present disclosure. The apparatus 100 includes, at least, an adjusting unit 110 and a treatment unit 120, respectively coupled to each other via a conveyor 101; and a controlling unit 130 for controlling the adjusting unit 110 and the treatment unit 120. The adjusting unit 110 is designed to detect and adjust the orientation of each cigarette (or cigarette waste) entering the apparatus before it is forwarded to the treatment unit 120, where the actual recycling takes place. Accordingly, each cigarette leaving the adjusting unit 110 will be aligned in sequence on the conveyor 101 with the same orientation. Once the cigarettes reach the treatment unit 120, each cigarette is then cut, extruded, clamped and etc, so that reusable materials therein from each cigarette filter may be isolated and reused in the future. The reusable material preferably is CA.

The controlling unit 130 includes, at least, a power supply module 160, a control module 170 and a fluid supply module 180 respectively coupling to each other. The power supply module 160 provides electrical energy to power the operation of the apparatus 100; the fluid supply module 180 provides a compressed fluid (e.g., compressed air) to the adjusting unit 110 and the treatment unit 120 during operation; while the control module 170 is set to receive instructions from an operator to command each and every members of the apparatus 100.

Figure 2:
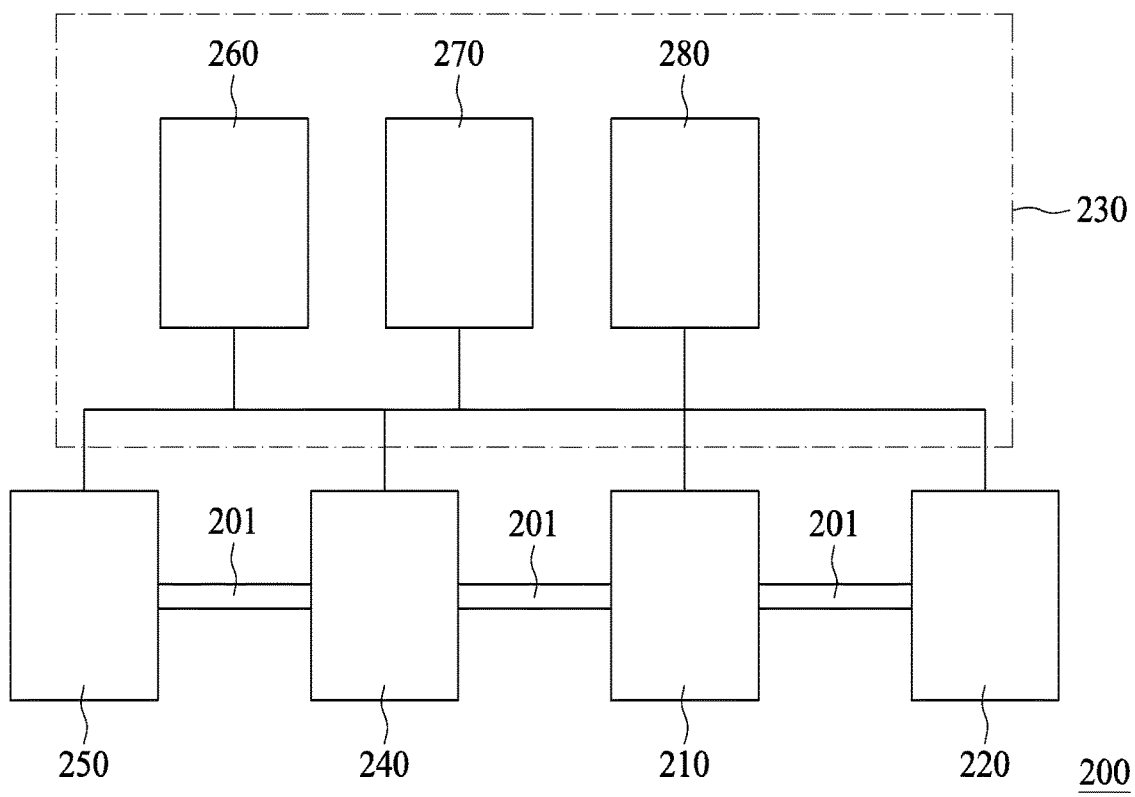
FIG. 2 is a schematic diagram illustrating the floor plan of an apparatus 200 for recycling cigarette waste according to another embodiment of the present disclosure.

Reference is now made to FIG. 2, which is the floor plan of an apparatus 200 for recycling cigarette waste according to another embodiment of the present disclosure. In general, the members/elements in the apparatus 200 are similar to those in the apparatus 100, so that the same the members/elements are not described herein for the sake of simplicity and brevity.

The apparatus 200 in this embodiment differs from the apparatus 100 in FIG. 1 in that, in addition to an adjusting unit 210; a treatment unit 220; and a control unit 230 independently as those described above in FIG. 1, the apparatus 200 further includes a sorting unit 240 and a feeding unit 250, both units (240, 250) are coupled to each other and to the adjusting unit 210 via a conveyor 201.

The apparatus 200 is under control of the control unit 230, which includes a power supply module 260, a control module 270 and a fluid supply module 280, with their respective functions same as those described in FIG. 1.

Turning to the feeding unit 250, which is a reservoir for receiving and storing cigarettes or cigarette waste intended to be recycled by the apparatus 200. The sorting unit 240, disposed downstream to the feeding unit 250, is configure to identify and eliminate cigarette(s) that are unsuitable for recycling by the apparatus 200. Cigarettes or cigarette waste unsuitable for recycling by the present apparatus 200 are those that fail to meet certain pre-determined parameters, such as size, length, conductivity, reflective index, and etc, thus are removed before recycling starts. To this purpose, various types of sensors may be used, such as a size sensor, a capacitive sensor, an inductive sensor, an infrared sensor, a reflective sensor, a camera, and etc. Depending on the type of a chosen sensor, pre-determined parameter(s) is set by an operator before recycling. According to some preferred embodiments, a size sensor is employed to eliminate unqualified cigarettes, i.e., cigarettes that do not satisfy certain size criteria, accordingly, the pre-determined parameter is the size of a cigarette waste. For example, a cigarette length about 1 to 2 cm may be pre-set by the operator to expel those that are too small to be recycled. In some embodiments, the pre-determined length is set to be at least 1.5 cm, accordingly a cigarette (e.g., a cigarette butt) shorter than 1.5 cm in length is expelled by the sorting unit 240 either mechanically or pneumatically. In one example, the cigarette butt shorter than 1.5 cm is blown away by a jet stream of a compressed air. In another example, the cigarette butt shorter than 1.5 cm is pushed out of the conveyor 201 by use of a remover. Note that to the purpose of recycling re-useable material from cigarette waste, a cigarette butt shorter than 1.5 cm does not contain sufficient material (e.g., CA) worthy of recycling.

Figure 3:
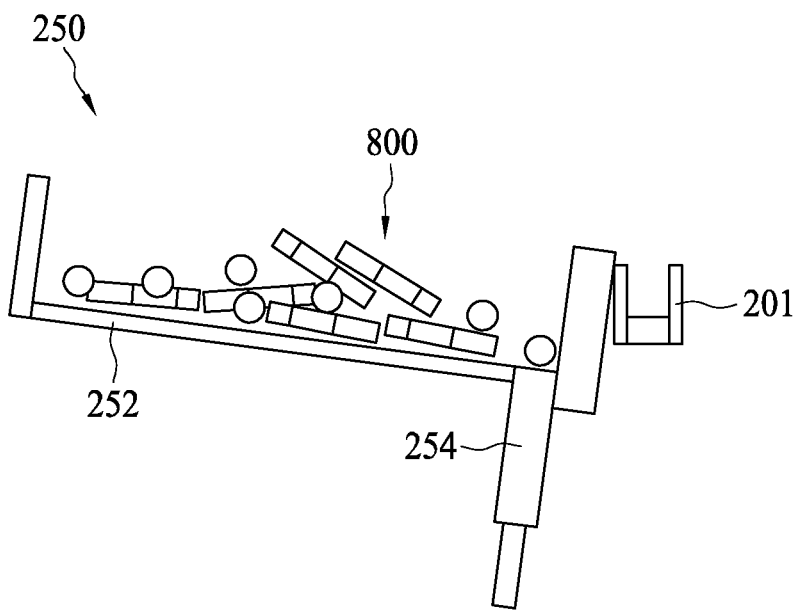
FIG. 3 is a schematic diagrams depicting the structure components of the feeding unit 250 of the apparatus 200 of FIG. 2.
Figure 4:
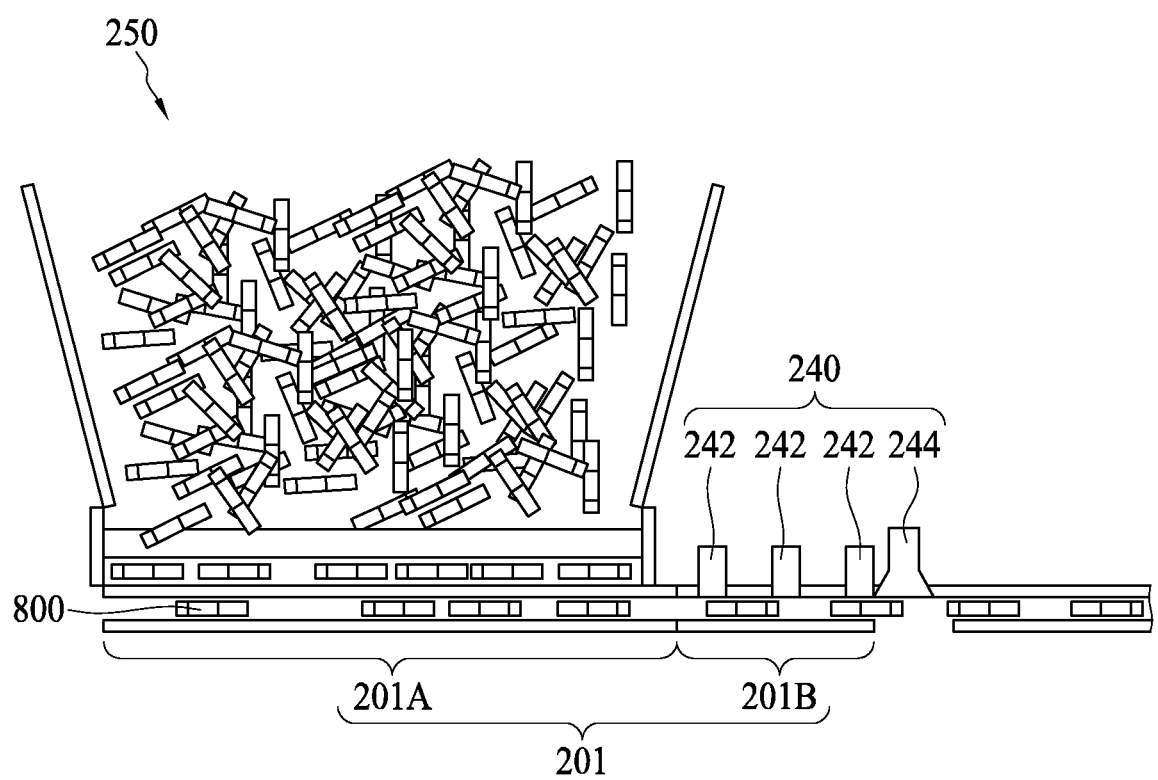
FIG. 4 is a schematic diagrams depicting the structure components of the feeding unit 250 and the sorting unit 240 of the apparatus 200 of FIG. 2.
Figure 5A:
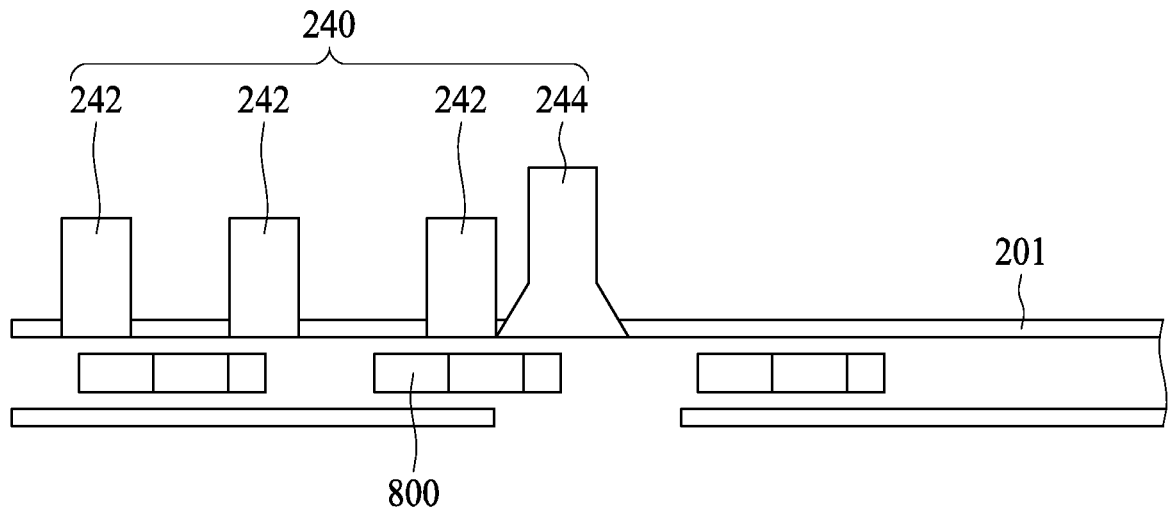
FIGS. 5A and 5B respectively illustrates the operation of the sorting unit 240 of the apparatus 200 of FIG. 2.

References are now made to FIGS. 3 to 5, which are schematic diagrams independently depicting the structure components of the feeding unit 250 and/or the sorting unit 240.

The feeding unit 250 may be any feeder commonly known in the related art, such as a step feeder, an elevator feeder, or a water fall conveyor. As exemplified in FIG. 3, a step feeder is chosen to serve as the feeding unit 250, which includes, at least, a tank 252 for housing a plurality of cigarettes 800; and a ladder 254 configured to move in vertical direction. During operation, the ladder 254 moves upward and pushes individual cigarette(s) 800 out of the tank 252 and into the conveyor 201, so that they are carried into the sorting unit 240. Preferably, the conveyor 201 is set to move at two different speeds, in which the section of the conveyor carrying cigarettes 800 just leaving the feeding unit 250, that is, conveyor 201A, is set to move at a relatively slower speed; while the section of the conveyor carrying cigarettes 800 into the sorting unit 240, that is, conveyor 201B, is set to move at a relatively faster speed, so as to increase the distance between any two cigarettes passing through the sorting unit 240 (FIG. 4). Alternatively or optionally, the conveyor 203 may be set to move at a constant speed.

Figure 5B:
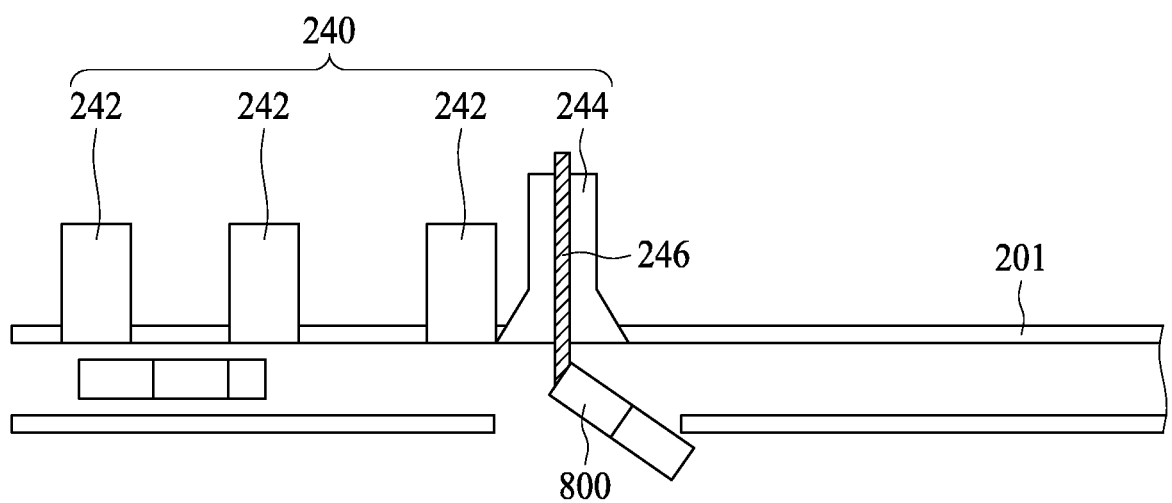

Turing to the sorting unit 240, which includes, at least one size sensor 242; and a remover 244. Each size sensor 242 is configured to identify the size (e.g., the length) of each cigarette passing there through. As exemplified in FIGS. 5A and 5B, at least 3 size sensors 242 are disposed along one side of the conveyor 201, followed by a remover 244. The size (or length) information picked up by the size sensor 242 is transmitted to the control unit 230, which then commands the remover 244 to expel unqualified cigarette(s) (e.g., cigarettes that do not meet a pre-determined size) out from the conveyor 201. The number of the size sensor may vary depends on the need. In one embodiment, the remover 244 has a shape of a nozzle (FIG. 5A), and is configured to eject a stream of compressed fluid suppled from the fluid supply module 280 in the control unit 230 to expel unqualified cigarette(s) out of the conveyor 201. In another embodiment, the remover 244 is configured to comprise a rod member 246, which is used to push the unwanted cigarette(s) out of the conveyor 201 (FIG. 5B). The expelled cigarette(s) are collected in a waste tank (not shown) and tossed away.

Qualified cigarettes or cigarette waste (i.e., those that pass through the sorting unit 240) are then forwarded to the adjusting unit 210, in which each cigarette is aligned in sequence with the same orientation, such as by having each cigarette in vertical direction with its filter end disposed below the non-filter end.

Figure 6:
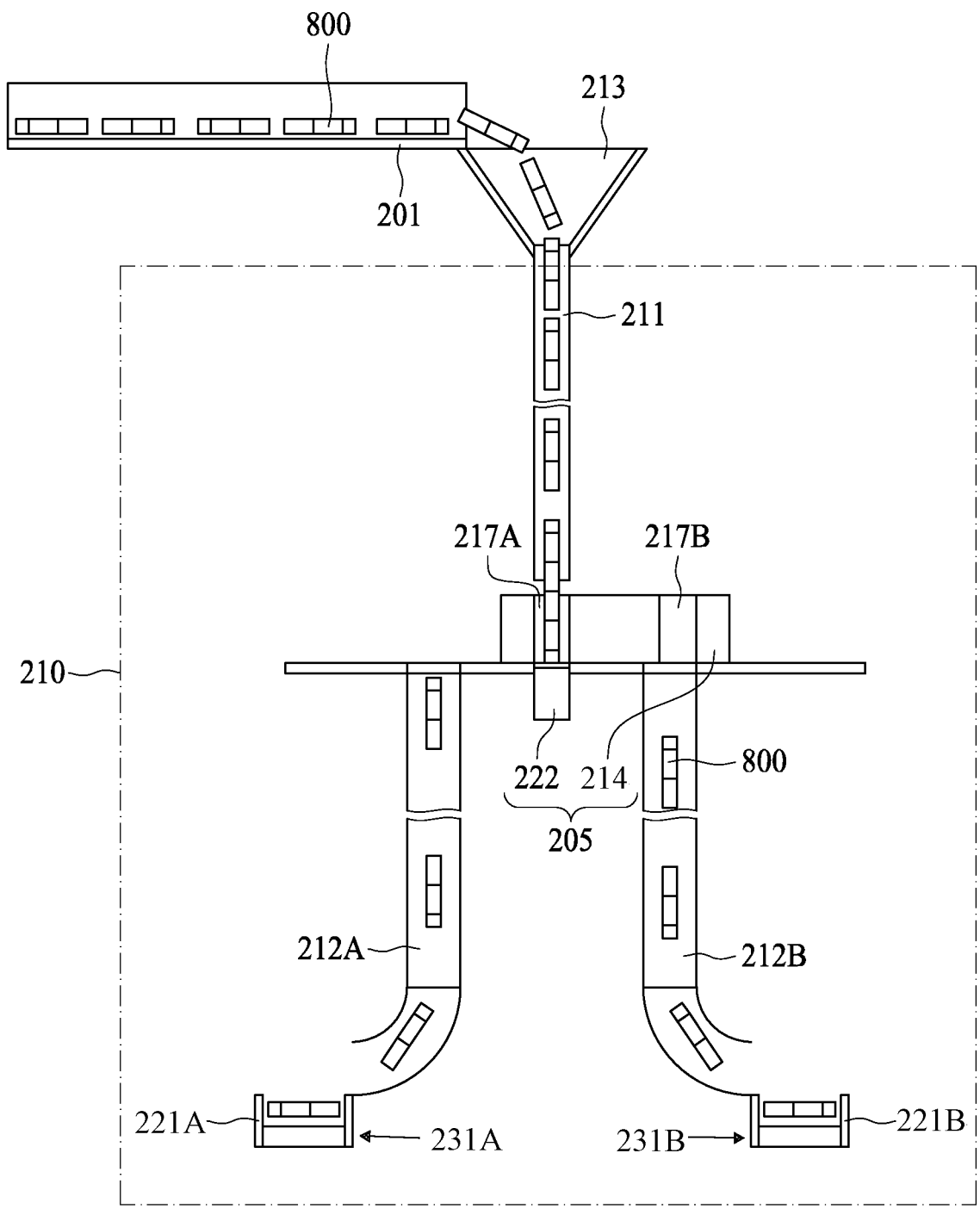
FIG. 6 is a schematic diagram illustrating the components of the adjusting unit 210 and how it works according to one embodiment of the present disclosure.

Reference is now made to FIG. 6, which is a schematic diagram illustrating the components of the adjusting unit 210 and how it works according to one embodiment of the present disclosure. Structurally speaking, the adjusting unit 210 comprises a first conduit 211, a sensing unit 205, second conduits (212A, 212B) and rotatory members (231A, 231B). The sensing unit 205 includes, at least a first receiver 214 having two troughs (217A, 217B) therein, and an orientation sensor 222 disposed below the first receiver 214. The rotatory member (231A or 231B) includes, at least a second receiver (221A or 221B) and an actuator 219 (not depicted). As depicted in FIG. 6, qualified cigarettes 800 leaving the sorting unit 240 are independently caught by an optional funnel 213 disposed right next to the conveyor 201, and forwarded to the first conduit 211. Each cigarette 800 leaving the first conduit 211 is then captured by one of the troughs (217A, 217B) in the first receiver 214, and the orientation of the captured cigarette 800 in the troughs (217A, 217B) is immediately determined by the orientation sensor 222 disposed below the first receiver 214. The first receiver 214 is configured to move laterally to release the captured cigarette 800 into one of the second conduits (212A, 212B). The released cigarette 800 carried by each of the second conduits is then caught by one of the second receivers (221A, 221B) in one of the rotatory members (231A, 231B). Each rotatory member may rotate in desired degrees, such as from about 10 to 180 degrees, to bring the orientation of the cigarette 800 therein to be same as a pre-determined orientation. If the orientation of the cigarette 800 in the rotatory member (231A, 231B) is same as the pre-determined orientation, then the rotatory member (231A, 231B) will keep its original orientation without rotating. In preferred embodiments, each rotatory member (231A, 231B) rotates 180 degrees to bring the orientation of the cigarette 800 therein to be same as the pre-determined orientation.

Figure 7:
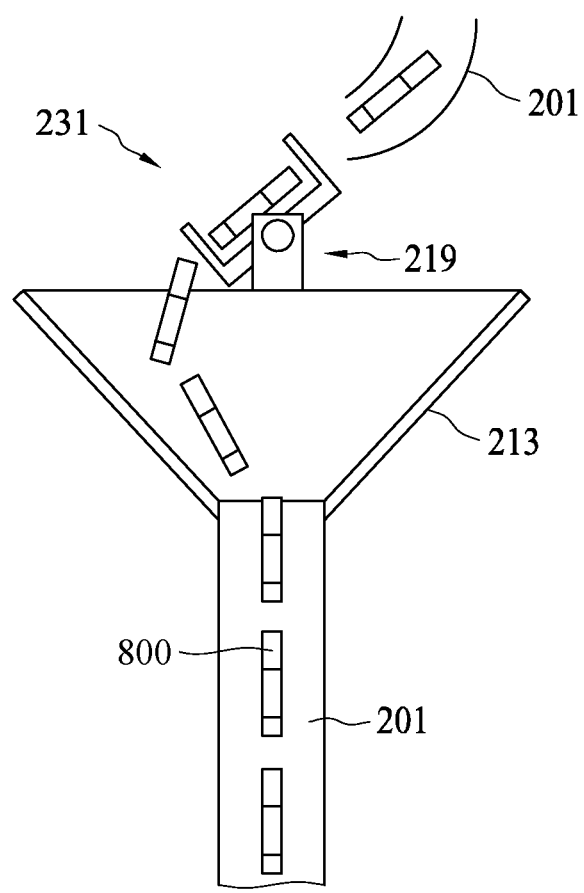
FIG. 7 depicts how the cigarette 800 in the rotatory member (231A, 231B) is transported out of the adjusting unit 210 of the apparatus 200 of FIG. 2.

Continue to FIG. 7, which depicts how the cigarette 800 in the rotatory member 231 is transported out of the adjusting unit 210. The rotatory member 231 having a cigarette in the desired orientation (or the pre-determined orientation) is tilted by the action of the actuator 219 under the command of the control module 270, to discharge the cigarette 800 housed therein, allowing the cigarette(s) to be captured by an optional funnel 213 disposed right next to the rotatory member 231 and then is carried away by the conveyor 201 to the treatment unit 220. Note that the term "tilted" refers to the action of the rotatory member undertakes to release or discharge the cigarette 800 housed in the rotatory member, thus should not be confused with the rotatory action the rotatory member takes to bring the orientation of the cigarette consistent with the pre-determined orientation.

Figure 8A:
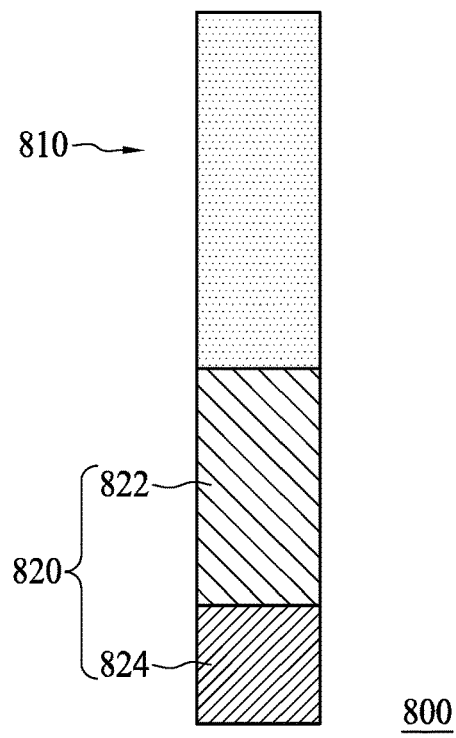
FIGS. 8A and 8B are schematic diagrams respectively illustrating the orientation and components of each cigarette 800 leaving the adjusting unit 210 of the apparatus 200 of FIG. 2.
Figure 8B:
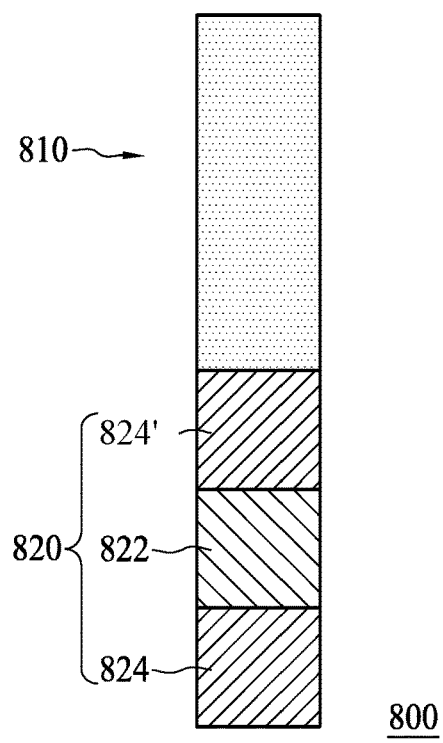

Preferably, each cigarette 800 leaving the adjusting unit 210 is oriented vertically as depicted in FIG. 8A, in which the non-filter part 810 (i.e., the part consists of tobacco wrapped in cigarette paper) is at the top, while the filter 820, which includes at least a block of CA (824) and a block of non-CA material (822), is at the bottom. Alternatively or optionally, the filter 820 of the cigarette 800 may comprise two blocks of CA (824, 824'), and one block of non-CA material (e.g., active carbon, PP, PLA and etc) (822) disposed between the two blocks of CA (824, 824') (FIG. 8B).

Figure 9A:
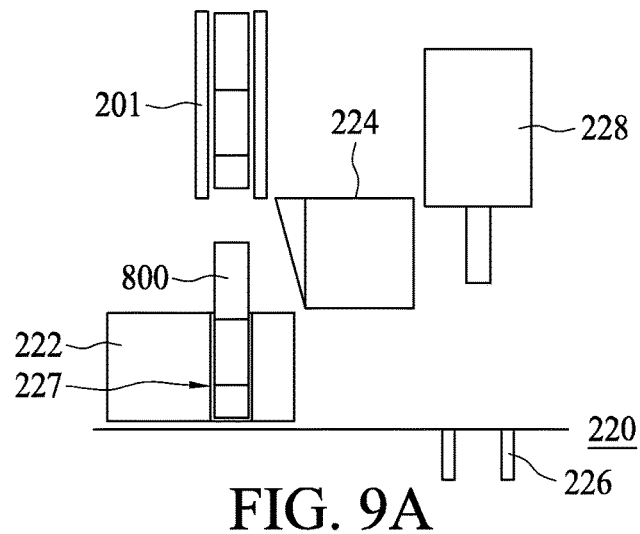
FIGS. 9A to 9J are schematic diagrams illustrating the components of the treatment unit 220 and how it works in accordance with one preferred embodiment of the present disclosure.
Figure 9B:
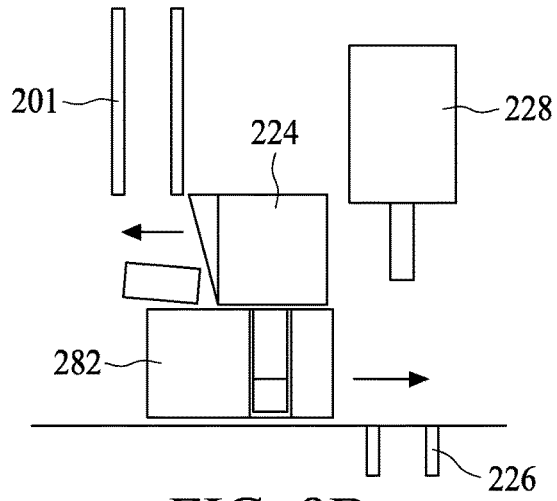
Figure 9C:
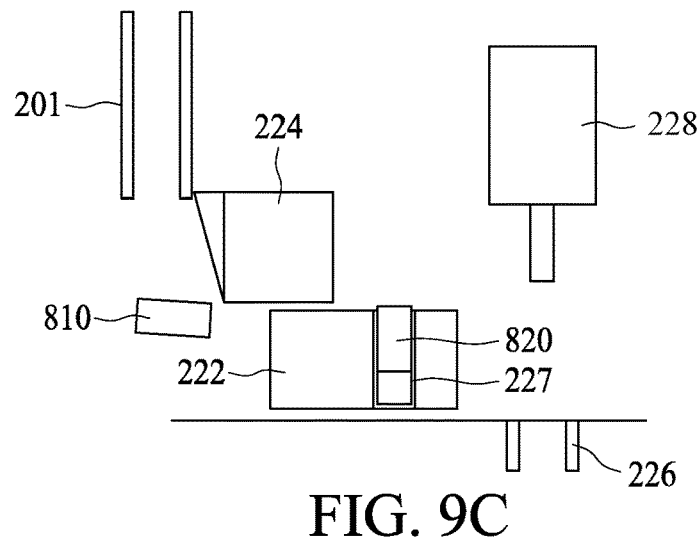
Figure 9D:
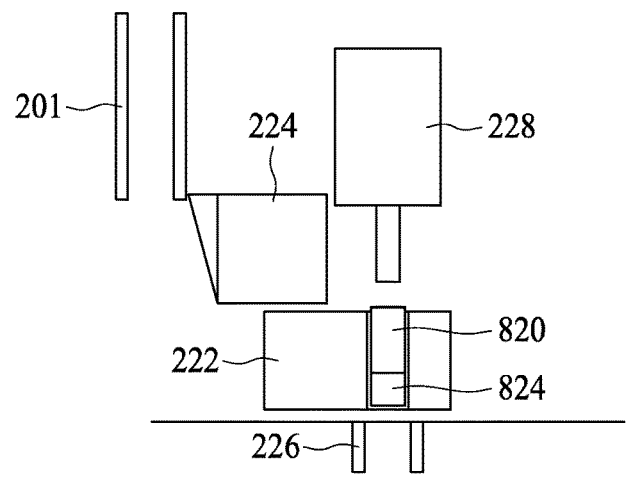

Continue to FIGS. 9A to 9J, which are schematic diagrams illustrating the components of the treatment unit 220 and how it works in accordance with one preferred embodiment of the present disclosure. Structurally speaking, the treatment unit 220 comprises a holder 222 having a trough 227 for receiving and holding a cigarette 800 therein; a cutter 224; an extruder 228; and a clamper 226. Preferably, the cutter 224, the holder 222, and the clamper 226 may independently move laterally. As described above, each cigarette 800 leaving the adjusting unit 210 is oriented in vertical direction as depicted in FIG. 8, with the non-filter part 810 of the cigarette 800 oriented toward the top, accordingly, when the cigarette 800 falls into the trough 227 of the holder 222, the filter 820 would be inside the trough 227, while the non-filter part 810 is exposed out of the holder 222 (FIG. 9A). Note that the trough 227 has a depth no more than the length of the filter of the cigarette 800. In some embodiments, the cutter 224 may then move in to cut away the exposed non-filter part 810 of the cigarette 800. Alternatively or optionally, the cutter 224 stays stationary, while the holder 222 moves from its original position (i.e., the first position) towards the cutter 224, allowing the exposed non-filter part 810 of the cigarette 800 to be cut off. Still optionally, in some embodiments, both the cutter 224 and the holder 222 move simultaneously toward each other (i.e., the holder 222 and the cutter 224 respectively move in opposite directions) to cut away the non-filter part 810, as depicted in FIGS. 9B and 9C. Alternatively or optionally, the holder 222 stays stationary, while the cutter 224 moves from its original position towards the holder 222, and cut off the exposed non-filter part 810 of the cigarette 800.

Figure 9E:
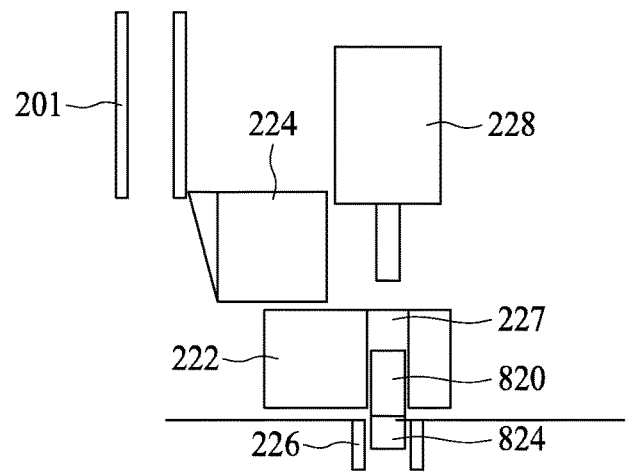
Figure 9F:
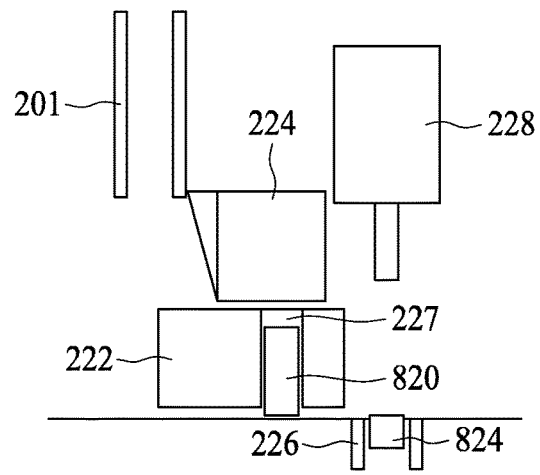

After the non-filter part 810 is cut off, the holder 222, in which only the filter 820 of the cigarette 800 remains in the trough 227, will then move to a second position, which is right below the extruder 228 (FIG. 9D), allowing the extruder 228 to extend downward into the trough 227 and pushes at least a part of the filter 820 out of the trough 227, the push-out part of the filter 820 is clamped by the clamper 226, which is disposed underneath the treatment unit 220 (FIG. 9E).

Preferably, the part of the filter 820 composed of CA (i.e., the CA block 824) is pushed out of the trough 227 and clamped by the clamper 226. A pre-determined distance of the extruder may extend downward is pre-set by the operator, such distance in turn would determine how much length of the filter is pushed out of the trough 227 or may be clamped by the clamper 826.

Figure 9G:
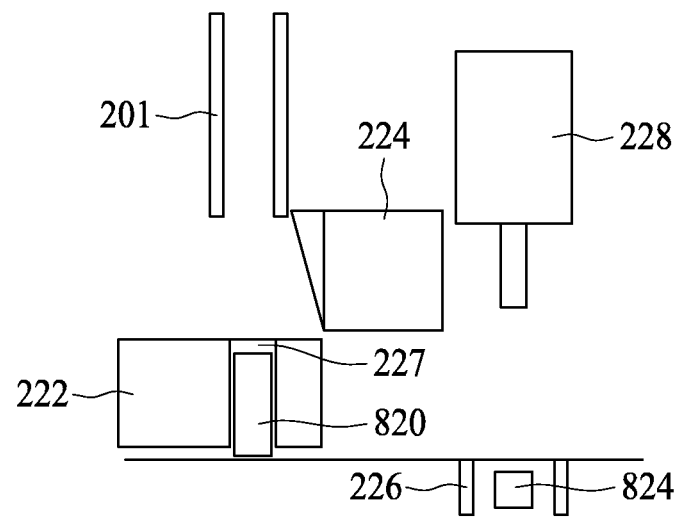
Figure 9H:
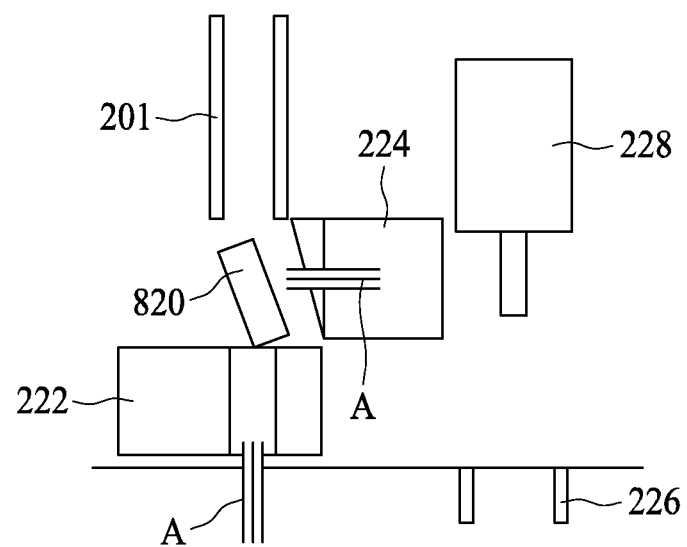

Then, the holder 222, still holding part of the filter 820 (e.g., PLA block) starts to move back to its original position (i.e., the first position), with the CA block 824 being clamped by the clamper 226, the movement of the holder 222 (depicted by the arrow in FIG. 9F) creates a force to physically separate the push-out part of the filter 820 (e.g., CA block 824) from the rest of the filter 820 (FIG. 9G). The holder 222 having the remaining part of the filter 820 in the trough 227 returns to its original position (i.e., the first position), a jet stream of a compressed air is then directed from the bottom of the trough 277 or above the trough 227 (e.g., from the cutter 224) to eject the remaining part of the filter 820 (i.e., the non-CA block of the filter 820) out of the holder 222 (FIG. 9H). The compressed air is suppled from the supply module 280 under the command of the control module 270. Alternatively, the clamper 226 clamping the push-out part of the filter 820 moves away from the holder 222, while the holder 222 remains stationary, thereby creates a force to separate the push-out part of the filter 820 from the remaining part of the filter 800 that is held by the holder 822.

Figure 9I:
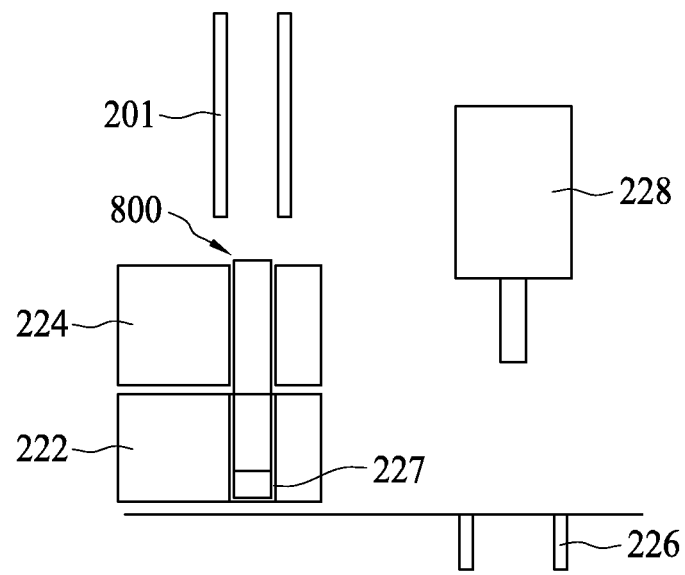
Figure 9J:
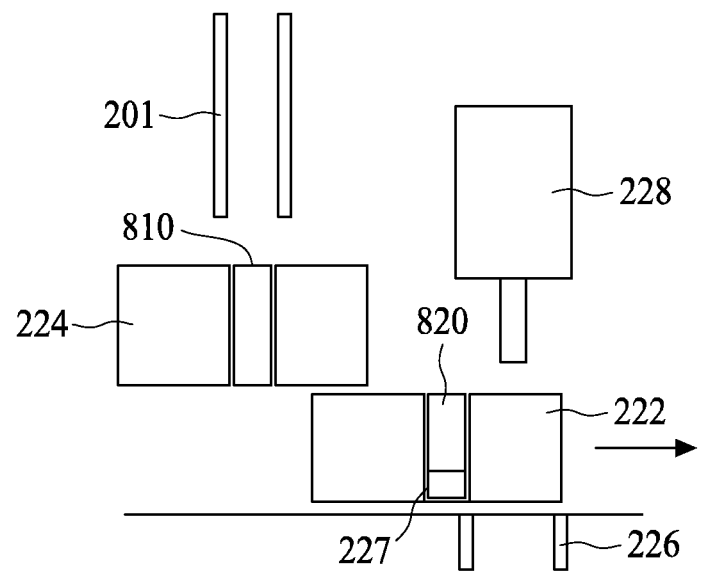

Alternatively or optionally, the cutter 224 is configured to comprise a trough 225 for accommodating a cigarette waste (FIG. 9I). In this embodiment, the cutter 224 and the holder 222, specifically, the trough 225 of the cutter 224 and the trough 227 of the holder 222, line up underneath the conveyor 201, allowing each cigarette 800 leaving the adjusting unit 210 to fall directly into the troughs 225 and 227, so that the filter 820 is held by the trough 227 of the holder 222, while the non-filter part 810 is held by the trough 225 of the cutter 224 (FIG. 9I). Then, with the holder 222 moving from its original position (i.e., the first position) towards the second position (i.e., underneath the extruder 228) and the cutter 224 remains stationary, a force is created to physically separate the non-filter part 810 from the filter 820 (FIG. 9J). The filter 820 may then be further processed in accordance with the same manner described in FIGS. 9D to 9H, to separate CA from the remaining part of the filter 820.

Figure 10A:
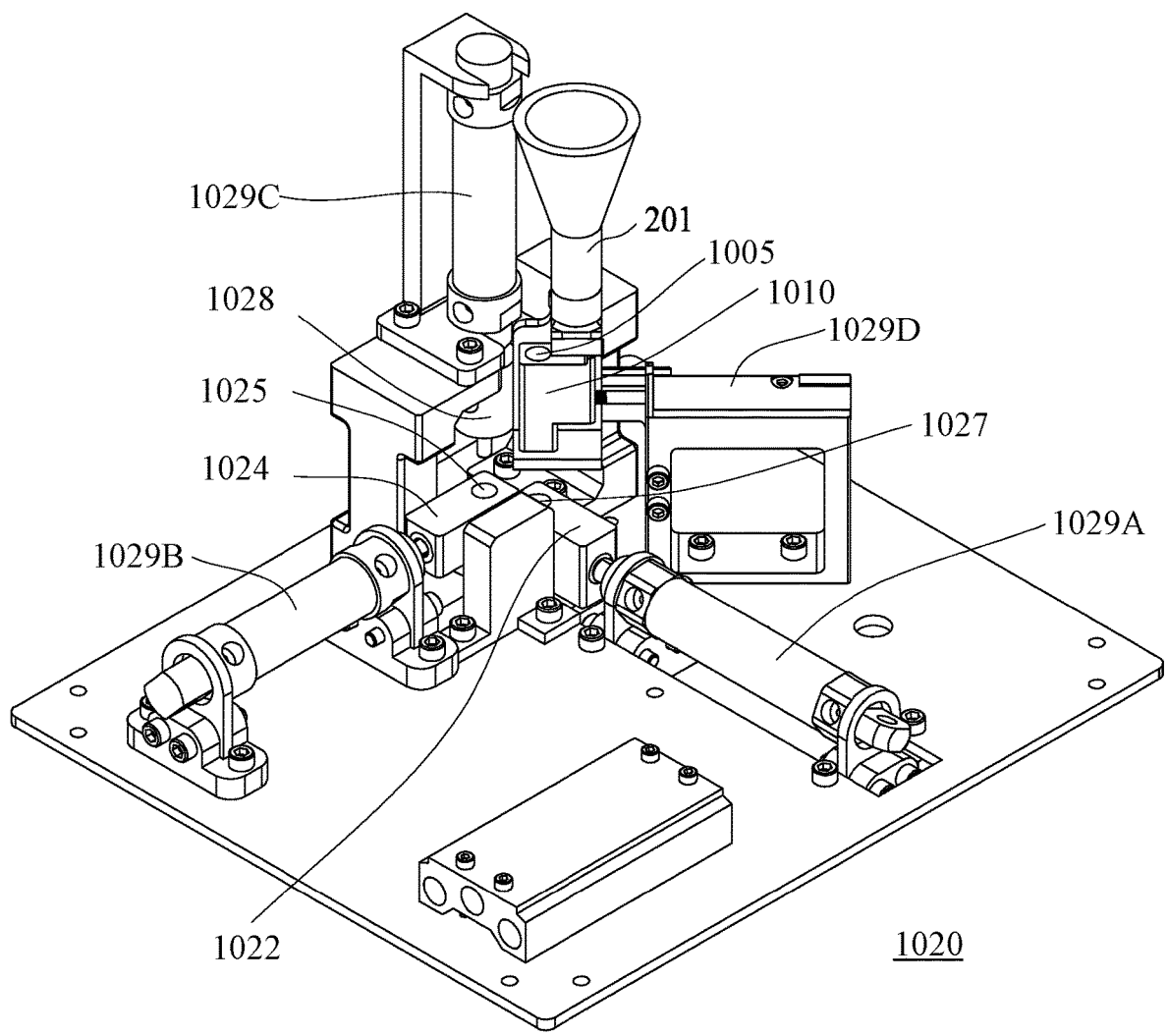
FIG. 10A is a three-dimensional view of a treatment unit 1020 in accordance with another embodiment of the present disclosure.
Figure 10B:
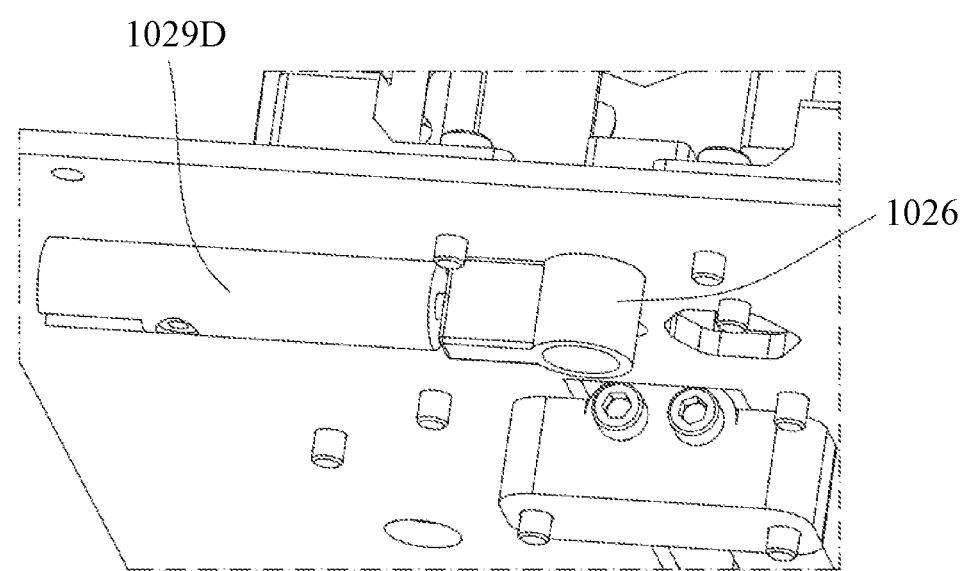
FIG. 10B is a partial blown-up of the treatment unit 1020 of FIG. 10A depicting the clamper 1026 and a linear driver 1029D coupled thereto in accordance with another embodiment of the present disclosure.

References are now made to FIGS. 10A and 10B. FIG. 10A is a three-dimensional view of a treatment unit 1020 in accordance with another embodiment of the present disclosure. FIG. 10B is a partial blown-up of the treatment unit 1020 of FIG. 10A depicting a clamper 1026 and a linear driver 1029D coupled thereto. As depicted, the treatment unit 1020 comprises a feeder 1010, a holder 1022 having a trough 1027 for receiving the cigarette, a cutter 1024, a clamper 1026 (which is disposed underneath the treatment unit 1020, thus is not visible from FIG. 10A), and an extruder 1028, respectively driven by linear drivers to move laterally and/or vertically. During operation, each cigarette 800 leaving the adjusting unit 210 is aligned in a desired orientation (i.e., FIG. 8) and carried by the conveyor 201 until it reaches the feeder 1010 of the treatment unit 1020. The feeder 1010 is driven by a linear driver 1029D, and can move laterally to a position right underneath the conveyor 201 to receive cigarette 800 one at a time, which immediately enters a conduit 1005 of the feeder 1010 and is delivered to the holder 1022. In this embodiment, the cutter 1024 is constructed to comprise a trough 1025 for receiving at least a part of the cigarette 800, as exemplified in FIGS. 9I and 9J. In general, the holder 1022, the cutter 1024, the clamper 1026, and the extruder 1028 independently operates in the same manner described in FIG. 9. With the independent actions of the holder 1022, the cutter 1024, the clamper 1026, and the extruder 1028, the CA block 824 of the filter 820 is separated from the remaining part of the filter (i.e., the block 822). The CA blocks 824 are collected and forwarded to a treatment plant for recycling, while the non-CA block 822 is discarded. Alternatively or optionally, both CA and non-CA blocks (822, 824) are independently collected and recycled. Preferably, the movements of the holder 1022, the cutter 1024, the extruder 1028, and the clamper 1026 are independently driven by linear drivers 1029A, 1029B, 1029C, and 1029D. For example, the holder 1022 and the cutter 1024 independently moves laterally between the first and second positions through the actions of the linear drivers 1029A and 1029B. Similarly, the extruder 1028 moves vertically between up and down positions through the action of linear driver 1029C; and the clamper 1026 moves laterally underneath the treatment unit 1020 through the action of the linear driver 1029D.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An apparatus for recycling cigarettes, in which each cigarette comprises
    a filter and a non-filter part, and the apparatus comprises,
        a conveying member for transporting the cigarettes;
        an adjusting unit operably linked to the conveying member and configured to adjust the orientation of the cigarettes so that each cigarette is aligned in sequence with the same orientation; and
        a treatment unit operably linked to the adjusting unit, in which the treatment unit comprises:
            a holder for holding the aligned cigarettes in a manner that the non-filter part of each cigarette is exposed out of the holder;
            a cutter configured to cut out the non-filter part of each cigarette held by the holder;
            a pusher configured to go into the holder and push a part of the filter of each cigarette out of the holder after the non-filter part of each cigarette is removed by the cutter; and
            a clamper disposed below the holder for clamping the pushed-out part of the filter of each cigarette, so that the pushed-out part can be physically separated from the remaining part of the filter that remained in the holder, when (1) the holder moves away from the clamper, while the clamper remains stationary, or (2) when the clamper moves away from the holder, while the holder remains stationary.

2. The apparatus of claim 1, wherein in the treatment unit, the pushed-out part of the filter is substantially made of cellulose acetate (CA).

3. The apparatus of claim 1, further comprising a fluid supply module configured to supply a compressed fluid to the conveying member, the cutter, and/or the holder.

4. The apparatus of claim 1, wherein the adjusting unit comprises:
  a first conduit for receiving the cigarettes in sequence;
  a sensing unit comprising a first receiver coupling to the first conduit for capturing the cigarettes transferred out from the first conduit; and an orientation sensor for detecting the orientation of each cigarette captured in the first receiver; and
  a rotatory member comprising a second receiver for accommodating the cigarettes transferred from the sensing unit; and an actuator configure to rotate the second receiver until each cigarette transferred out of the adjusting unit are aligned in the same orientation.

5. The apparatus of claim 1, further comprising a feeding unit for transferring the cigarettes onto the conveying member.

6. The apparatus of claim 5, further comprising a sorting unit coupling to the feeding unit for sorting the cigarettes based on a pre-determined parameter, the pre-determined parameter is any of a size, a length, a conductivity or a combination thereof, of the cigarette.

7. The apparatus of claim 6, wherein the sorting unit comprises:
  a sensor for identifying the size of each cigarette; and
  a remover configured to expel the cigarettes respectively having sizes that do not meet with a pre-determined size out from the sorting unit.

8. The apparatus of claim 7, wherein the remover is configured to expel the cigarettes respectively having sizes that do not meet with a pre-determined size via a compressed fluid.

9. The apparatus of claim 7, wherein the remover is configured to expel the cigarettes respectively having sizes that do not meet with a pre-determined size via use of a rod member disposed above the conveying member to push the cigarettes out of the conveying member.

* * * * *